A. POWELL.
Combined Harrow, Roller, and Seeder.
No. 98,627.
2 Sheets—Sheet 2.
Patented Jan'y 4, 1870.
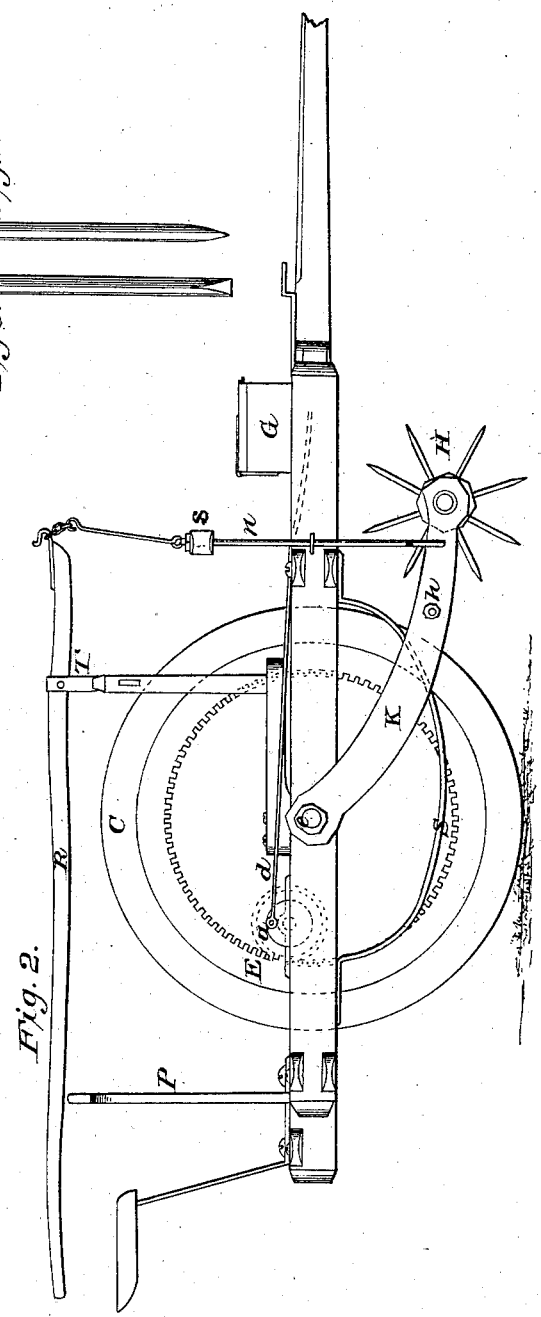

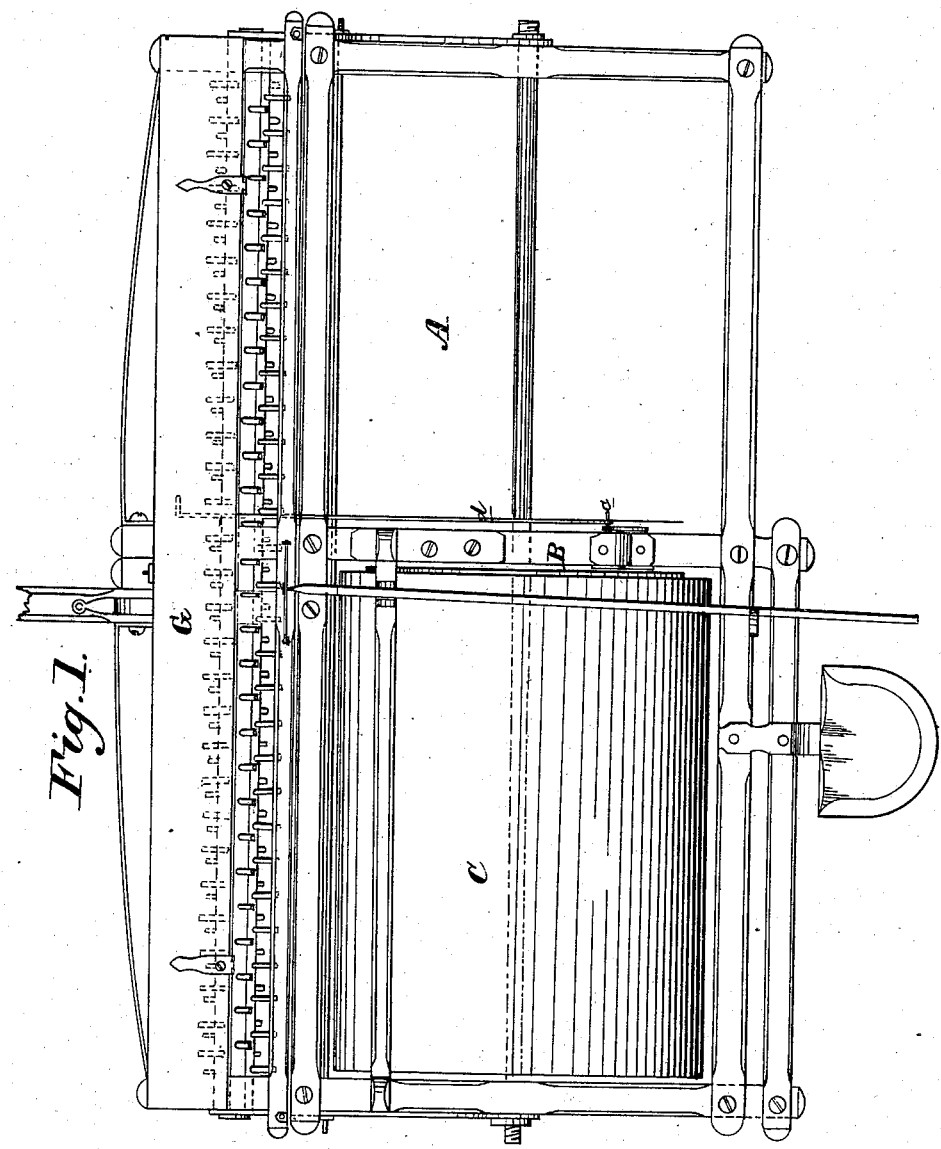

United States Patent Office.

AMBROSE POWELL, OF NEW BALTIMORE, NEW YORK.

Letters Patent No. 98,627, dated January 4, 1870.

IMPROVEMENT IN COMBINED HARROW, ROLLER, AND SEEDER.

The Schedule referred to in these Letters Patent and making part of the same.

*To all whom it may concern:*

Be it known that I, AMBROSE POWELL, of New Baltimore, in the county of Greene, and State of New York, have invented a new and valuable Improvement in Combined Harrow, Roller, and Seeder; and do hereby declare that the following is a full, clear, and exact description of the construction and operation of the same, reference being had to the annexed drawings, making a part of this specification, and to the letters and figures of reference marked thereon.

Figure 1, of the drawings, is a plan view of my device, and

Figure 2 is a longitudinal section thereof.

Figures 3 and 4 are details, showing the harrow-teeth.

My invention relates to agricultural implements, and

It consists in a novel arrangement of a combined harrow and roller, adapted to serve an efficient purpose in the cultivation of soil.

A, of the drawings, represents a quadrangular frame, divided into two sections by the cross-beam B.

In one or both of these sections of the frame, I arrange a roller, C, upon the longitudinal rod D, and in the manner shown. Said rod serves as an axle for the rotation of said rollers.

In order to adapt my machine to a seed-sower, (a dummy representation of which is shown on the drawings, and marked G,) I affix to the end of a roller the toothed plate E, adapted to work with the pinion $a$, as shown on fig. 2.

This pinion is arranged on a shaft, that has its bearing upon the cross-beam B, and at its opposite end is the crank $c$.

To this crank is attached the rod $d$, which connects with and actuates a seed-sower, when desirable so to do.

H, of the drawings, represents my revolving harrow. It consists of a rotating shaft, with a series of teeth, arranged therein in eight rows, more or less, a portion of which are shown.

My method of adjusting the harrow constitutes a leading idea of my invention, and is as follows, namely:

At each end of the frame, and pivoted to the rod D, is a swinging bar, K, secured to said rod by a nut, $e$.

These two arms are connected by the rod $h$, and at their extreme lower or front ends, respectively, I make an opening, adapted to receive the gudgeons of the harrow-shaft, and allow the same to revolve therein, by which arrangement, the harrow is brought as nearly as practicable to the motive-power.

The letter $n$ is a rod, hinged to the arm K, and a duplicate thereof is arranged for the other of said arms. They respectively extend upward to, and are attached to the longitudinal bar $s$, which, in turn, is connected with the lever R, in the manner represented on fig. 2.

T is the fulcrum of the lever R, and P is a notched standard, arranged for holding down the rear end of lever R, and thereby suspend the harrow from the ground, when desirable, for transportation or other purposes.

S represents a guard, attached to each end of the frame, to aid in regulating the movements of the swinging arms.

What I claim as my invention, and desire to secure by Letters Patent, is—

1. The combination of the swinging arms K and lifting-apparatus, as described, when constructed and arranged substantially as and for the purposes specified.

2. The arrangement, herein shown and described, of the revolving harrow H, rod $n$, bar $s$, guards L, lever R, and roller C, when constructed substantially as specified.

In testimony that I claim the above, I have hereunto subscribed my name, in the presence of two witnesses.

AMBROSE POWELL.

Witnesses:
E. W. ANDERSON,
D D. KANE.